Figure 1:
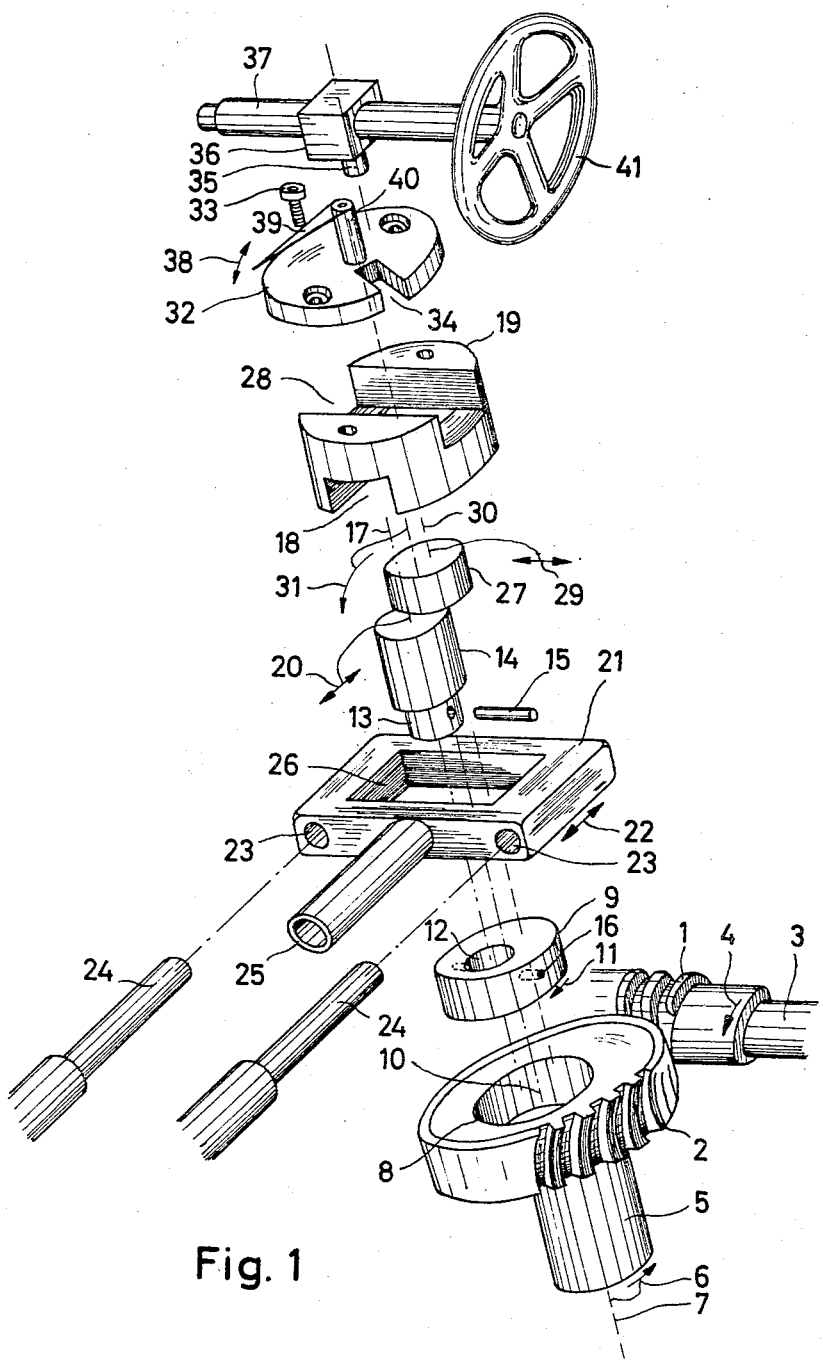

March 26, 1968

G. H. JESSE 3,374,683

TRANSMISSION DEVICES FOR CONVERTING ROTARY MOTION INTO RECIPROCATING MOTION

Filed March 9, 1966

3 Sheets-Sheet 1

INVENTOR.
GERHARD HELMUT JESSE
BY
Bair, Freeman & Molinare
Attys.

March 26, 1968   G. H. JESSE   3,374,683
TRANSMISSION DEVICES FOR CONVERTING ROTARY MOTION INTO
RECIPROCATING MOTION
Filed March 9, 1966   3 Sheets-Sheet 3

INVENTOR.
GERHARD HELMUT JESSE
BY
Bair, Freeman & Molinare
Attys.

United States Patent Office 3,374,683
Patented Mar. 26, 1968

3,374,683
TRANSMISSION DEVICES FOR CONVERTING ROTARY MOTION INTO RECIPROCATING MOTION
Gerhard Helmut Jesse, Am Bostelberg 147,
Hellendorf, Hannover, Germany
Filed Mar. 9, 1966, Ser. No. 533,091
Claims priority, application Germany, Mar. 10, 1965,
J 27,668
10 Claims. (Cl. 74—50)

This invention relates to improvements in transmission devices for converting rotary motion into reciprocating motion and is particularly concerned with such transmission devices wherein the amplitude of the reciprocating motion is adjustable. Such transmission devices are of particular, but not exclusive application to proportioning pumps.

It is known to drive a proportioning pump by means of a transmission device comprising a rotating cam arranged to displace a tappet to drive the pump piston. In order to adjust the amplitude or stroke of displacement of the tappet and, hence, the piston means is provided to adjust the gap between the tappet and the cam. Thus, for all adjustments below that of maximum stroke, only a portion of the available displacement is utilised and the tappet engages the cam for only a part of each cam revolution. The result is that the pump action is irregular and jerky, wear is increased and considerable noise is developed. The wear extends not only to the transmission or driving mechanism, but also to the pump system and the associated valves. Furthermore, vibrations are liable to develop in the associated pipe lines and these may be propagated over great distances. Additionally, the accuracy of the dosage delivered by the pump is also affected.

It is highly desirable that the reciprocating motion should be as nearly sinusoidal as possible in order to minimise the disadvantages referred to. A known transmission device for converting rotary motion into a sinusoidal reciprocating motion is a crank drive, but this has the disadvantage that the stroke is not adjustable during use. Additionally, in order to approach, as nearly as possible, the desired sinusoidal reciprocating motion, the connecting rod of the crank drive must be relatively long with the result that the length of the device becomes appreciable. In fact, a true sinusoidal reciprocating motion can only be obtained when the connecting rod is of infinite length.

It is also known to convert rotary motion into a non-sinusoidal reciprocating motion and then to transform this reciprocating motion into sinsusoidal reciprocating motion by means a slide-block guide the inclination of which is adjustable to vary the amplitude of stroke. Such a known device is very complicated as is the double conversion of movement and has the further disadvantage that a sinusoidal reciprocating motion is not attainable over the entire range of adjustment.

It is an object of the present invention to provide an improved transmission device for converting rotary motion into reciprocating motion of adjustable stroke, which device shall not be subject to the disadvantages referred to at least to the same extent as the known devices.

It is a further object of the invention to provide an improved transmission device for converting rotary motion to reciprocating motion which shall be capable of compact construction, shall be robust in use and economic to manufacture.

According to the present invention, there is provided a transmission device for converting rotary motion into reciprocating motion comprising a pair of guides extending in mutually perpendicular directions, first and second rotatable members connected to each other and slidably disposed one in each of said guides and each mounted for rotation about a separate one of two spaced parallel axes, a third rotatable member operatively connected to one of said first and second members and rotatable about a third axis between and parallel to said two spaced axes and contained in the plane of said two spaced axes, means for rotating said third member about a fourth axis parallel to said two spaced axes and passing through the intersection of said guides, a reciprocable member operatively engaged by one of said first and second members and reciprocable in a first direction in a plane normal to said axes whilst permitting displacement of the engaged one of said first and second members in a second direction normal to said first direction and in the same plane, and means operable angularly to adjust said two guides about said fourth axis to control the amplitude of reciprocation of said reciprocable member.

Preferably, said first and second members are each of circular cross-section and are respectively coaxial with said first and second axes and said guides are provided by two slots formed in a guide member and extending in mutually perpendicular directions, the first and second members being each slidably and rotatably engaged in a separate one of said slots.

Advantageously, said third member is of circular section about said third axis and said means for rotating said third member about said fourth axis comprises a driving member rotatable about said fourth axis and formed with a circular section bore disposed coaxially with said third axis and eccentrically with respect to said fourth axis by distance substantially equal to one-half the spacing between said first and second axes, said third member being disposed in said bore and being rotatable about said third and fourth axes.

Figure 2:
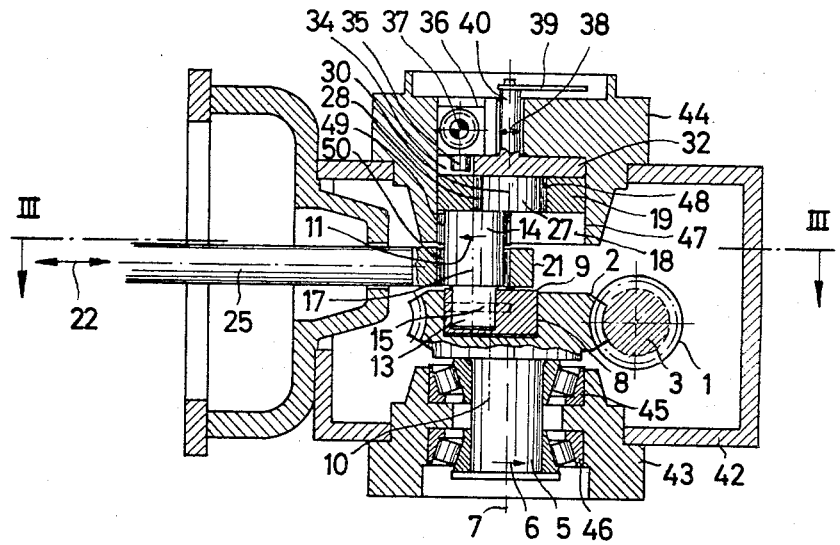
Figure 3:
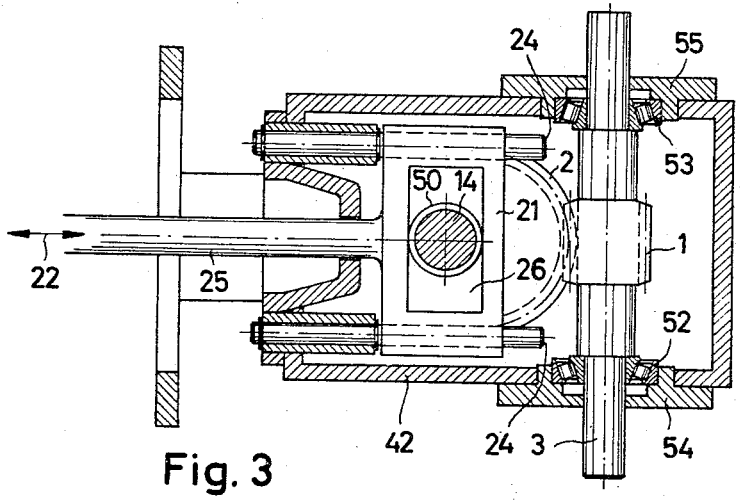
Figure 4:
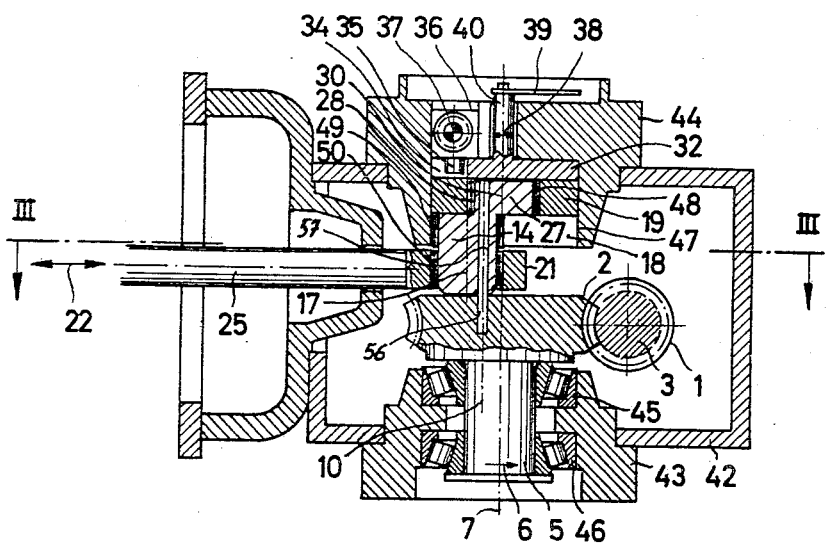

Some embodiments of the inventions will now be described by way of example, reference being made to the accompanying drawings in which:

FIG. 1 is an exploded view of the essential parts of one embodiment of the invention, FIG. 2 is a sectional view of the embodiment illustrated in FIG. 1, FIG. 3 is a section taken on the line III—III of FIG. 2, and FIG. 4 is a view similar to FIG. 2 illustrating a modification.

In the embodiment illustrated in FIGS. 1 to 3 there is provided a worm gear comprising a worm 1 engaged with a worm wheel 2 and carried on a drive shaft 3 rotatable in the direction indicated by the arrow 4. The worm wheel 2 is mounted on a shaft 5 and is driven by the worm 1 in the direction indicated by the arrow 6 about the axis 7.

The worm wheel 2 is formed with an eccentric bore or recess 8 in one face in which is rotatably received a rotatable member 9 of circular cross-section about the axis 10. The member 9 rotates in the bore 8 in the direction indicated by the arrow 11.

An eccentric bore or recess 12 is formed in the member 9 and receives an extension 13 of a further rotatable member 14. A pin 15 extends through a bore 16 in the member 9 and through the extension 13 to secure together the members 9 and 14. The member 14 and the extension 13 thereof are of circular cross-section about the axis indicated at 17. The member 14 is slidably engaged in a slot 18 formed in a guide member 19 for displacement in the direction indicated by the arrow 20. The member 14 engages a reciprocable member 21 to cause the latter to execute a reciprocating motion in the direction of the arrow 22. The reciprocable member 21 is provided with two holes 23 into which extend guide rods 24 limiting the displacement of the member 21 to the direction denoted by the arrow 22. The motion of the member 21 is transmitted, for example, to the piston of a proportioning pump by a connecting rod 25.

The reciprocable member 21 is of substantially rectangular shape and is formed with a substantially rectangular guide slot 26 in which is engaged the rotatable member 14. The dimensions of the member 14 and the slot 26 are such that there is little or no play allowed the member 14 in the direction of the arrow 22 but the member 14 can move in the slot 26 in a second direction normal to that denoted by the arrow 22.

A further rotatable member 27 is connected to and carried by the member 14 and is of circular cross-section about the axis 30. The members 14 and 27 are radially off-set with respect to each other so that the axes 17 and 30 are in spaced parallel relationship with the axis 10 disposed therebetween and contained in the plane thereof. The axis 10 is in fact radially spaced from the axis 7 by a distance corresponding to one-half of the spacing of the axes 17 and 30. The guide member 19 is formed with a slot or groove 28 in which is slidably engaged the member 27. The member 14 is rotatable in the slot 18 and the member 27 is rotatable in the slot 28. The slots 18 and 28 extend in mutually perpendicular directions and the axis 7 extends through the point of intersection of the slots 18 and 28.

An adjusting plate 32 is secured to the guide member 19 by screws 33 and is formed with a radial slot 34 engaged by a pin 35 of a regulating member 36 carried on a threaded rod 37. The threaded rod 37 is spaced from the axis 7, so that displacement of the pin 35 along the rod 37 rotates the plate 32 and hence angularly displaces the guide member 19 about the axis 7 in the direction of the arrow 38. A pointer 39 is carried on a spindle 40 on the plate 32 to provide a visible indication of the angular adjustment of the guide member and hence of the slots 18 and 28. A handwheel 41 is provided to rotate the threaded rod 37 and effect the angular adjustment.

In the operation of the transmission device described, the rotation of the shaft 3 (or of the shaft 5) results in reciprocating motion of the member 21 the amplitude of which can be controlled by angularly adjusting the guide member 19 about the axis 7. In the position illustrated, the slot 18 extends parallel to the direction 22 and maximum stroke is achieved with no displacement of the member 14 normal to this direction. As the shaft 5 is rotated in the direction of the arrow 6 about the axis 7, the member 9 with its axis 10 is rotated about the axis 7 in the direction denoted by the arrow 31. At the same time, the members 9, 14 and 27 are rotated in the opposite direction denoted by the arrow 11. Also, the member 14 is constrained to follow the slot 18 while the member 27 is constrained to follow the slot 27, each executing one complete reciprocation in the associated slot per revolution of the worm wheel 2. The reciprocable member follows the movement of the member 14 but is constrained by the guides 24 to follow only that component thereof in the direction of the arrow 22. The reciprocating motion of the member 14 and hence of the member 21 is sinusoidal.

If the guide member 19 is angularly displaced from the position shown, then, the rectilineal displacement of the member 14 has a lesser component in the direction of the arrow 22 and a component in the direction normal thereto. This results in a lesser amplitude of stroke of the member 21 and in the relative displacement of the member 14 in the slot 26 in the direction normal to the arrow 22, such relative displacement being lost to the member 21.

If the guide member 19 is angularly displaced from the position shown through 90°, then the member 14 has no component of rectilinear motion in the direction of the arrow 22 and the amplitude of reciprocation of the member 21 is zero, all the rectilinear motion of the member 14 being lost in the slot 26 by relative displacement in the direction normal to that indicated by the arrow 22.

The transmission device described may be extended to a double transmission with the worm 1 driving an additional arrangement identical to that described but disposed on the other side of the shaft 3, i.e. as a mirror image of the arrangement described, so that the worm 1 drives two such devices.

The arrangement for angularly adjusting the guide member 19 as indicated in FIG. 1 permits only a limited rotation of same, but is nevertheless sufficient to vary the amplitude of the travel movement between zero and the maximum stroke. In certain cases, it may be desirable to adjust the phase position of the reciprocation with respect to the rotary movement of the drive, within wide limits. According to a further development of the invention, this can be achieved in simple manner for example by replacing the slot 34 in the adjusting plate 32 by a peripheral toothed crown in which the threaded rod engages directly. The result is that the guide member 19 can be rotated through a full 360° and consequently the phase position of the reciprocating motion with respect to the driving rotary motion is also adjustable by 360°.

FIGS. 2 and 3 show the component parts of FIG. 1 combined in a constructional assembly. The parts are put together and fitted in a housing 42 having bearing cases 43 and 44. Bearing case 43 contains two roller bearings 45 and 46 for supporting the shaft 5. Bearing case 44 is provided with a bore 47 in which the guide member 19 is rotatably mounted, together with the adjusting plate 32. The spindle 40 protrudes outwards through the bearing case 44, so that the pointer 39 is externally visible. The members 14 and 27 carry bearing brushes 48, 49 and 50 (not shown in FIG. 1). In the embodiment illustrated in FIGS. 2 and 3, the bearing brushes slide rotatably in the respective guide slots 18 and 28. Of course it is also possible to arrange that the members 14 and 27 rotate in the bearing brushes. In this event these latter need no longer be circular as shown but may then rest with a greater contact area against the walls defining the guide slots 18 and 28, so that the surface pressure becomes less. The housing 42 is provided with a flange 51 for connecting up with a proportioning pump. As already described, the drive is effected via shaft 3 and this is mounted in roller bearings 52 and 53. These roller bearings 52 and 53 are inserted in bearing plates 54 and 55 which are secured to housing 42.

In the embodiment illustrated in FIGS. 1 to 3, the members 14 and 27 are chiefly guided with respect to their rotation by the member 9, so that when members 14 and 27 are under load, the member 9 tends to tilt in its bore 8, with the result that the bearing pressure and the wear may be increased. For this reason it is convenient to modify the arrangement in the manner shown in FIG. 4, by inserting a spindle 56, preferably fixedly, into the worm wheel 2, this spindle penetrating through a bore 57 in the members 9, 14 and 27. These latter can then turn about the spindle 56 which guides them exactly with regard to their rotary movement. On account of the relatively great length of spindle 56, tilting and jamming are avoided and excessive wear can no longer occur. The spindle 56 is of course arranged coaxially with the axis 10.

I claim:

1. A transmission device for converting rotary motion into reciprocating motion comprising a pair of guides extending in mutually perpendicular directions, first and second rotatable members connected to each other and slidably disposed one in each of said guides and each mounted for rotation about a separate one of two spaced parallel axes, a third rotatable member operatively connected to one of said first and second members and rotatable about a third axis between and parallel to said two spaced axes and contained in the plane of said two spaced axes, means for rotating said third member about a fourth axis parallel to said two spaced axes and passing through the intersection of said guides, a reciprocable member operatively engaged by one of said first and second members and reciprocable in a first direction in a plane normal to said axes whilst permitting displacement of the engaged one of said first and second members in a second direction normal to said first direction and in the same plane, and means operable angularly to adjust said two guides about said fourth axis to control the amplitude of reciprocation of said reciprocable member.

2. A device according to claim 1 wherein a pair of guide rods are operatively associated with said reciprocable member to limit displacement of said reciprocable member to said first direction.

3. A device according to claim 1 wherein said first and second members are each of circular cross-section and are respectively coaxial with said first and second axes and said guides are provided by two slots formed in a guide member and extending in mutually perpendicular directions, the first and second members being each slidably and rotatably engaged in a separate one of said slots.

4. A device according to claim 3 in which the reciprocable member is formed with a guide slot which is engaged by said first member.

5. A device according to claim 3 in which said third member is of circular section about said third axis and said means for rotating said third member about said fourth axis comprises a driving member rotatable about said fourth axis and formed with a circular section bore disposed coaxially with said third axis and eccentrically with respect to said fourth axis by distance substantially equal to one half the spacing between said first and second axes, said third member being disposed in said bore and being rotatable about said third and fourth axes.

6. A device according to claim 3 wherein said guide member is of circular cross-section about said fourth axis and is formed with a radial slot and wherein said angular adjustment means comprises a threaded rod and a pin carried on and displaceable by said threaded rod and engaged in said radial slot angularly to displace said guide member under the control of said threaded rod.

7. A device according to claim 3 wherein said guide member is of circular cross-section and is formed with peripheral teeth and wherein the angular adjustment means comprises a worm engaged with said peripheral teeth.

8. A device according to claim 3 wherein said guide member is of circular cross-section about said fourth axis and including a housing having a bore in which said guide member is supported for angular adjustment.

9. A device according to claim 1 wherein a spindle extending along said third axis is provided connecting said first, second and third members.

10. A device according to claim 1 including indicating means carried on said guides and operable to provide a visible indication of the angular adjustment thereof.

References Cited

UNITED STATES PATENTS

| | | | |
|---|---|---|---|
| 2,592,237 | 4/1952 | Bradley | 74—571 |
| 2,626,812 | 1/1953 | Jones | 64—1 |
| 3,188,873 | 6/1965 | Vowell et al. | 74—50 |

FRED C. MATTERN, JR., *Primary Examiner.*

W. S. RATLIFF, *Assistant Examiner.*